(12) United States Patent
Kurihara et al.

(10) Patent No.: US 6,214,506 B1
(45) Date of Patent: Apr. 10, 2001

(54) ELECTROPHOTOGRAPHIC PHOTOSENSITIVE MEMBER AND PROCESS FOR PRODUCING THE SAME

(75) Inventors: Syunichiro Kurihara; Takahiro Choda, both of Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/361,997

(22) Filed: Jul. 28, 1999

(30) Foreign Application Priority Data

Jul. 30, 1998 (JP) .................................................. 10-215203
Mar. 18, 1999 (JP) .................................................. 11-073292

(51) Int. Cl.$^7$ ...................................................... G03G 5/14
(52) U.S. Cl. ............................................. 430/65; 430/131
(58) Field of Search ....................................... 430/65, 131

(56) References Cited

U.S. PATENT DOCUMENTS

| 5,401,600 | * | 3/1995 | Aizawa et al. | ........................... 430/65 |
| 5,612,158 | | 3/1997 | Iguchi et al. | ............................ 430/63 |
| 5,658,702 | * | 8/1997 | Nukuda | .................................. 430/131 |
| 5,744,271 | * | 4/1998 | Aizawa et al. | ........................... 430/65 |
| 5,972,550 | * | 10/1999 | Tamura et al. | ......................... 430/131 |

FOREIGN PATENT DOCUMENTS

| 196 39 419 | 4/1997 | (DE) . |
| 0 713 153 | 5/1996 | (EP) . |
| 62-272277 | * 11/1987 | (JP) ......................................... 430/65 |
| WO 97/24289 | 7/1997 | (WO) . |

* cited by examiner

*Primary Examiner*—Roland Martin
(74) *Attorney, Agent, or Firm*—Oblon, Spivak, McClelland, Maier & Neustadt, P.C.

(57) ABSTRACT

An electrophotographic photosensitive member, including:
  a conductive substrate;
  an undercoat layer formed on the conductive substrate, which contains a binder resin and metal oxide particles treated with an organic metal compound represented by formula (1):

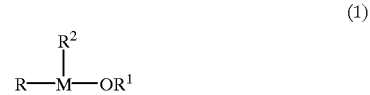

(1)

where
  M is —Si$^3$, —TiR$^3$ or Al;
  R is a hydrogen atom or a $C_1$ to $C_6$ alkyl group;
  R$^1$ and R$^2$ are each, independently, a $C_1$ to $C_6$ alkyl group;
  R$^3$ is a $C_1$ to $C_6$ alkyl group which may be substituted with an alkoxy group or a $C_1$ to $C_6$ alkoxy group which may be substituted with an alkoxy group; and
  a photosensitive layer formed on the undercoat layer.

14 Claims, No Drawings

ELECTROPHOTOGRAPHIC PHOTOSENSITIVE MEMBER AND PROCESS FOR PRODUCING THE SAME

BACKGROUND OF THE INVENTION

1. Field of the Invention

The present invention relates to an electrophotographic photosensitive member having an undercoat layer, a process for producing the electrophotographic photosensitive member, and to titanium oxide which is surface-treated so as to impart hydrophobicity thereto.

2. Description of the Background

In recent years, electrophotographic techniques have been extensively applied to not only copying machines but also various printers, because of, for example, high printing speed and formation of high-quality images. As photosensitive members constituting the main component of electrophotographic apparatuses, organic photoconductive materials (OPC) have become predominately used instead of inorganic photoconductive materials, such as selenium, arsenic-selenium alloy, cadmium sulfide or zinc oxide, because of the ease in selection of exposure light wavelength range, facilitated production producible by coating), use of harmless materials from the standpoint of safety, among others. There have been developed various type OPCs such as single layer type OPCs obtained by dispersing a charge-generation substance and a charge-transport substance in a binder, laminated type OPCs comprising two function-separating layers, i.e., a charge-generation layer and a charge-transport layer, and the like. Among these OPCs, the laminated-type OPCs having such a structure that the charge-generation layer and the charge-transport layer are successively laminated on a substrate, have been ordinarily used.

Further, recently, in order to enhance electrophotographic properties, image-forming properties and mechanical properties of the photosensitive member, electrophotographic photosensitive members obtained by successively laminating an undercoat layer and a photosensitive layer on a substrate have been widely used.

As preferable binder resins for the undercoat layer, there have been studied and frequently used alcohol-soluble resins, especially alcohol-soluble polyaride resins, from the standpoints of adhesion to the substrate, solvent resistance (resistance to solvents used in the charge-generation and charge-transport layers), coating property and electric barrier property.

Further, in order to satisfy the requirements for the undercoat layer, inorganic particles such as metal oxide particles, especially titanium oxide particles, have been used in the undercoat layer. Besides, in order to enhance the performance of the undercoat layer, there has been developed such a technique that the metal oxide particles are treated with an organic compound. In particular, there is known a method of treating the particles with a metal-containing organic compound such as an organic silicon compound (U.S. Pat. No. 5,612,158).

As metal oxide particles treated with such an organic compound, there is ordinarily known those treated with polysiloxanes such as dimethyl polysiloxane or methyl hydrogen polysiloxane, stearic acid or the like.

Meanwhile, when a coating solution containing metal oxide particles treated with an organic compound is prepared, the organic compound is usually liberated in the coating solution upon dispersion- and heat-treatments or the like. In addition, after the production of the coating solution, the organic compound is liberated over time. At present, it has been difficult to completely prevent the liberation of the organic compound as a treating agent.

For this reason, in the case where the layer containing metal oxide particles treated with an organic compound, is formed by coating, the organic compound liberated from the metal oxide particles tends to be associated with each other in the coating solution, so that defects such as crawling tend to occur upon coating. As a result, a good coating film is difficult to produce. Especially in the case of electrophotographic photosensitive members, the defects, such as crawling in the undercoat layer tend to cause image defects, resulting in problems such as deteriorated yield.

In order to solve these problems, there has been proposed, for example, a method of preventing an organic compound from being liberated in a coating solution by previously washing the organic compound-treated metal oxide particles with an organic solvent, thereby inhibiting defects such as crawling of the undercoat layer (Japanese Patent Application Laid-open (KOKAI) No. 10-282502).

However, this method requires additional steps such as washing with the organic solvent, separating between the organic solvent and the metal oxide particles, drying of the metal oxide particles or the like. As a result, the method becomes disadvantageous in productivity and costs.

Accordingly, there remains a need for electrophotographic photosensitive members which overcome the disadvantages described above.

SUMMARY OF THE INVENTION

It is an object of the present invention to provide an electrophotographic photosensitive member having an undercoat layer, which has excellent functional properties and can be produced without defects, such as crawling, during formation of the undercoat layer.

It is another object of the invention to provide a method of making the electrophotographic photosensitive member.

It is another object of the invention to provide modified titanium oxide particles which can be used in the manufacture of electrophotographic photosensitive members.

The present invention is based in the inventors' discovery that when an undercoat layer is formed by a coating method and the undercoat layer comprises a binder resin and metal oxide particles treated with an organic metal compound represented by the following general formula (1):

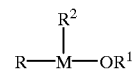

(1)

where M is $-SiR^3$, $-TiR^3$ or Al; R is a hydrogen atom or a $C_1$ to $C_6$ alkyl group; $R^1$ and $R^2$ are individually a $C_1$ to $C_6$ alkyl group; $R^3$ is a $C_1$ to $C_6$, alkyl group, a $C_1$ to $C_6$ alkoxy group, a $C_2$ to $C_6$ alkoxyalkyl group or a $C_2$ to $C_6$ alkoxyalkoxy group, defects such as crawling of the undercoat-layer can be avoided, and the obtained electrophotographic photosensitive member has superior properties.

Accordingly, the objects of the invention, and others, may be accomplished with an electrophotographic photosensitive member comprising:

a conductive substrate, an undercoat layer formed on the conductive substrate which comprises a binder resin and metal oxide particles treated with an organic metal compound represented by formula (1), and a photosensitive layer formed on the undercoat layer.

The objects of the invention may also be accomplished with a process for producing the electrophotographic photosensitive member described above.

The objects of the invention may also be accomplished with a coating film which comprises a binder resin and metal oxide particles treated with the organic metal compound represented by formula (1).

The objects of the invention may also be accomplished with titanium dioxide treated with the organic metal compound represented by formula (1). The treated titanium oxide is particularly usefull for manufacturing the inventive electrophotographic photosensitive member.

A more complete appreciation of the invention and many of the attendant advantages thereof will be readily obtained as the same becomes better understood by reference to the following detailed description.

DETAILED DESCRIPTION OF THE INVENTION

The photosensitive member according to the present invention includes a conductive substrate. As the conductive substrates, there may be exemplified metal substrates comprising, for example, aluminum, stainless steel, copper, nickel or the like, or coated substrates obtained by forming a conductive layer comprising aluminum, copper, palladium, tin oxide, indium oxide, etc., on an insulating substrate such as a polyester film, paper, glass or the like. Among these conductive substrates, those produced by cutting an endless metal pipe comprising aluminum or the like into an appropriate length, are preferred. The surface of the conductive substrate may be subjected to various treatments such as, for example, oxidation treatment or chemical treatment, provided that these treatments do not adversely affect a quality of obtained images.

In the present invention, the undercoat layer is provided between the conductive substrate and the photosensitive layer. The undercoat layer used in the present invention comprises a binder resin and metal oxide parades treated with the organic compound represented by formula (1). As the binder resins, there may be exemplified thermoplastic resins such as polyvinyl acetal, e.g., polyvinyl butyral, cellulose-based resins, polyamide resins, epoxy resins, urethane resins, acrylic acid-based resins, methacrylic acid-based resins or the like; thermosetting resins; or photocurable resins. From the standpoints of adhesion to the substrate, solvent resistance, electric barrier property, coating property, dryability, etc., alcohol-soluble resins, especially alcohol-soluble polyamide resins are preferred. Among these, from the standpoints of enhancing the performance of the undercoat layer and stability of the coating solution, copolymerized polyamide resins containing a diamine component represented by the following general formula (3), are more preferred.

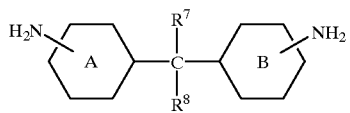

(3)

where

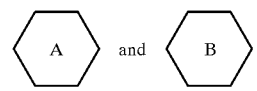

are individually a substituted or unsubstituted cyclohexyl ring; and $R^7$ and $R^8$ are individually a hydrogen atom, an alkyl group, an alkoxy group or an aryl group. The rings denoted A and B may be substituted with alkyl groups, having, for example, 1 to 6 carbon atoms. Preferably, such groups are saturated. Each ring may have one or more substituent. $R^7$ and $R^8$ may have, for example, 1 to 10 carbon atoms. In embodiments where an alcohol-soluble resin is used as a binder resin, as a matter of course, the main solvent used to apply the undercoat layer is alcohol.

The metal oxide particles are another constituent of the undercoat layer, and may be treated with the organic metal compound represented by formula (1). Specific examples of R in formula (1), include a hydrogen atom, methyl, ethyl, n-propyl, i-propyl, n-butyl,, sec-butyl, tetra-butyl, n-hexyl or the like. Among these groups, a hydrogen atom is more preferred. $R^1$ and $R^2$ are individually a linear or branched $C_1$ to $C_6$ alkyl group. In consideration of reactivity with the metal oxide particles upon the surface treatment, $C_1$ to $C_4$ alkyl groups are preferred. Among them, methyl and ethyl are more preferred. M is —$SiR^3$, —$TiR^3$ or Al, where $R^3$ is a $C_1$ to $C_6$ alkyl group, a $C_1$ to $C_6$ alkoxy group, a $C_2$ to $C_6$ alkoxyalkyl group or a $C_1$ to $C_6$ alkoxyalkoxy group. Specific examples of $R^3$ include alkyl groups such as methyl, ethyl, n-propyl, i-propyl, butyl, heptyl, hexyl or the like; alkoxy groups such as methoxy, ethoxy, propoxy, butoxy or the like; alkoxyalkyl groups such as methoxymethoxy, methoxyethoxy, ethoxymethoxy, ethoxyethoxy or the like. Among these groups, methyl, ethyl, methoxy and ethoxy are preferred, Among the organic metal compounds represented by the above general formula (1), organic silicon compounds represented by the following general formula (2) are especially preferred.

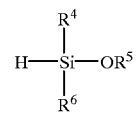

(2)

where $R^4$ and $R^5$ are individually methyl or ethyl; and $R^6$ is a group selected from the group consisting of methyl, ethyl, methoxy and ethoxy.

The surface treatment of the metal oxide particles with the above surface-treating agent may be conducted by either a dry method or a wet method. In the case of the dry method, the metal oxide particles as a base material are charged into a high-speed stirrer such as a Henschel mixer, a supermixer, etc., and then while stirring the metal oxide particles at a high speed, a solution of the surface-treating agent is dropped or sprayed thereto so as to uniformly deposit on the surfaces of the particles, or spray-added thereto so as to uniformly mix with the particles. Thereafter, the thus coated particles are dried. On the other hand, in the wet method, titanium oxide as a base material and the surface-treating agent are added into a solvent and dispersed therein by a ball mill, Coball Mill, a sand grill mill, a bead mill such as pearl mill or the like, and then the solvent is evaporated from the mixture. In both the dry and wet methods, it is preferred that the obtained particles are baked at a temperature of about 100° C. to about 200° C. during or after the surface treatment to strengthen the bond between the metal oxide and the surface-treating agent.

The amount of the surface-treating agent used is usually 0.01 to 100 parts by weight, preferably 0.1 to 10 parts by weight, based on 100 parts by weight of the metal oxide. These ranges include all specific values and subranges therebetween, including 0.02, 0.05, 0.2, 0.5, 1, 2, 5, 10, 25, 50 and 75 parts by weight of the surface-treating agent, based on 100 parts by weight of the metal oxide.

Among the above metal oxides, titanium oxide particles are preferred from the standpoint of enhancing properties of the undercoat layer. In addition, from the standpoint of enhancing properties of the undercoat layer and dispersion stability of the coating solution, titanium oxide particles have an average primary particle size of not more than 100 nm are more preferred. The titanium oxide particles may be either crystalline or amorphous. Most ordinary crystalline titanium oxide has a rutile structure. However, the titanium oxide used in the present invention may be in the form of anatase or brookite.

The metal oxide particles treated with the organic metal compound as described above may be further treated with, for example, inorganic materials such as alumina, silica, zirconia or the like.

The weight ratio of the metal oxide particles treated with the organic metal compound to the binder resin in the undercoat layer can be optionally selected. However, from the standpoint of enhancing properties of the undercoat layer and dispersion stability of the coating solution, the weight ratio is preferably 0.5:1 to 10:1, more preferably 2:1 to 5:1. These ranges include all specific values and subranges therebetween, such as 1:1, 3:1 and 8:1.

Further, various surfactants may be added in order to improve the coating property of the coating solution and the dispersibility of the particles therein. In addition, the coating solution for the undercoat layer may further contain other additives, such as leveling agents or anti-oxidizing agents.

The coating solution for the undercoat layer (hereinafter referred to as "undercoating solution") may be produced by the following method. The metal oxide particles, treated with the organic metal compound, are dispersed using a ball mill, Coball Mill, a sand mill or the like, and then diluted into an appropriate concentration, thereby preparing a slurry. The slurry is mixed with a binder solution previously prepared by dissolving the binder in a solvent, thereby producing an undercoating solution. Alternatively, binder pellets or powder may be directly added to the slurry, and the mixture is mixed and stirred together to dissolve the binder in the slurry, thereby producing the undercoating solution. Alternatively, the undercoating solution may be produced by adding the metal oxide particles treated with the organic compound to the binder solution and then dispersing the particles therein. In these production processes, various additives may be optionally added, and the metal oxide particles may be subjected to various treatments such as heat treatment or ultrasonic treatment, if required or desired.

The undercoating solution may then be applied onto the substrate and then dried, thereby forming the undercoat layer. As the coating methods, there may be used any of a spray coating method, a nozzle coating method, a blade coating method, a spin coating method, an immersion coating method and the like. Among these coating methods, the immersion coating method has been used most often.

The photosensitive layer is formed on the undercoat layer. The photosensitive layer may be in the form of a single layer. However, the photosensitive layer preferably has a laminated layer structure comprising two separate layers. i.e., a charge-generation layer and a charge-transport layer. In the case where the photosensitive layer has such a laminated layer structure, the charge-generation layer and the charge-transport layer are preferably successively formed on the undercoat layer in this order.

As charge-generation substances used in the charge-generation layer, there may be exemplified inorganic photoconductive materials such as selenium or alloys thereof, arsenic-selenium, cadmium sulfide, zinc oxide or the like; various organic pigments or dyes such as phthalocyanine, azo dyes, e.g., monoazo, bisazo or trisazo, quinacridon, polycyclic quinone, pyrylium salt, indigo, thioindigo, anthanthrone, pyranthrone or cyanine; or the like. Among these materials, those containing organic pigments are preferred. Further, metal-free (non-metallo) phthalocyanines, or metallophthalocyanines having a ligand comprising metal, metal oxide or metal chloride such as copper, indium chloride, gallium chloride, tin, oxytitanium, zinc, vanadium, hydroxy silicon or the like, are more preferred. Especially, oxytitanium phthalocyanine is particularly preferred.

The charge-generation layer may be produced by applying a coating solution obtained by dissolving or dispersing fine particles of these charge-generation substances and a binder polymer in a solvent, and then drying the coating solution applied. As the binders, there may be exemplified polymers or copolymers of vinyl compounds such as styrene, vinyl acetate, vinyl chloride, acrylic esters, methacrylic esters, vinyl alcohol, ethylvinyl ether; polyvinyl acetals; polycarbonates; polyesters; polyamides; polyurethanes; cellulose ethers; phenoxy resins; silicon resins; epoxy resins; or the like.

The ratio of the charge-generation substance to the binder polymer is not particularly restricted, but the binder polymer may be used in an amount of usually 5 to 500 parts by weight, preferably 20 to 300 parts by weight based on 100 parts by weight of the charge-generation substance. These ranges include all specific values and subranges therebetween, such as 10, 15, 25, 50, 75, 100, 200, 300 and 400 parts by weight of the binder polymer, based on 100 parts by weight of the charge-generation substance.

The charge-generation layer may also be constituted by a vapor-deposited film comprising the charge-generation substance.

The thickness of the charge-generation layer is usually 0.05 to 3 $\mu$m, preferably 0.1 to 1 $\mu$m. These ranges include all specific values and subranges therebetween, such as 0.075, 0.15, 0.2 and 0.25 $\mu$m.

The charge-transport layer may be produced by applying a coating solution obtained by mixing a charge-transport substance with a known excellent binder, dissolving the mixture in a solvent, and adding an electron attractive compound or other additives such as plasticizers or pigments, if required, onto the above charge-generation layer. The thickness of the charge-transport layer is usually 5 to 50 preferably 10 to 35 $\mu$m. These ranges include all specific values and subranges therebetween, such as 15, 20, 20, 30, 40 and 45 $\mu$m.

As the charge-transport substances contained in the charge-transport layer, there may be used high-molecular charge-transport compounds such as polyvinyl carbazole, polyvinyl pyrene, polyacenaphthylene or the like; or low-molecular compounds such as various pyrazoline derivatives, oxazole derivatives, hydrazone derivatives, stilbene derivatives, arylamine derivatives or butadiene derivatives.

As the binder polymers, there may be preferably used those polymers which have a good compatibility with the above charge-transport substance, and are free from recrystallization of the charge-transport substance and the phase separation after the formation of coating film. Examples of the preferred binder polymers may include polymers or copolymers of vinyl compounds such as styrene, vinyl acetate, vinyl chloride, acrylic esters, methacrylic esters, vinyl alcohol or ethylvinyl alcohol; polyvinyl acetals; polycarbonates; polyesters; polysulfones; polyphenylene oxides; polyurethanes; cellulose esters; cellulose ethers; phenoxy resins; silicon resins; epoxy resins; or the like. Among these binder polymers, polycarbonate resins are especially preferred. Also, these resins may be partially cross-linked.

As to the ratio of the charge-transport substance to the binder resin, the charge-transport substance may be used in an amount of usually 10 to 200 parts by weight, preferably 20 to 150 parts by weight based on 100 parts by weigh of the binder resin. These ranges include all specific values and subranges therebetween, such as 15, 25, 50, 75, 100 and 175 parts by weight of the charge-transport substance, based on 100 parts by weight of the binder resin.

As the electron attractive compounds which may be optionally added to the charge-transport layer, there may be exemplified cyano compounds of aromatic esters or the like having a tetracyano-quino-dimethane group, a dicyano-quino-methane group or a dicyano-quino-vinyl group; nitro compounds such as 2,4,6-trinitro fluorene; condensed polycyclic aromatic compounds such as perylene; diphenoquinone derivatives; quinones; aldehydes; ketones; esters; acid anhydrides; phthalides; metal complexes of substituted or unsubstituted salicylic acid; metal salts of substituted or unsubstituted salicylic acid; metal complexes of aromatic carboxylic acids; or metal salts of aromatic carboxylic acids. Among these electron attractive compounds, cyano compounds, nitro compounds, condensed polycyclic aromatic compounds, diphenoquine derivatives, metal complexes of substituted or unsubstituted salicylic acid, metal salts of substituted or unsubstituted salicylic acid, metal complexes of aromatic carboxylic acids and metal salts of aromatic carboxylic acids, are preferably eased.

Organic pigments, resin particles, metal oxides or the like may be added to the charge-transport layer in order to enhance mechanical strength thereof. When the metal oxide is added to the charge-transport layer, it is preferable to use metal oxide particles treated with the organic metal compound represented by formula (1) for the same reason as described as to the formation of the undercoat layer.

The photosensitive layer of the electrophotographic photosensitive member according to the present invention may further contain various known additives such as plasticizers, anti-oxidizing agents, ultra-violet light absorbing agents, leveling agents or the like, in order to improve film-forming property, flexibility, coating property and mechanical strength thereof.

Further, an overcoat layer may be formed on the photosensitive layer in order to enhance mechanical strength and resistance to gases such as ozone, $NO_x$ or the like. In the case where metal oxide particles are to be contained in the overcoat layer for enhancing mechanical strength thereof, it is also preferable to use metal oxide particles treated with the organic metal compound represented by formula (1) for the same reason as described above. As a matter of course, thin photosensitive member may be further provided with an adhesive layer, an intermediate layer, a transparent insulating layer or the like, if required or desired.

The photosensitive layer, the overcoat layer, etc., may be produced by an immersion coating method, a spray coating method, a nozzle coating method, or the like.

The electrophotographic photosensitive member produced according to the present invention may be subjected to various electrophotographic copying processes mainly including charging, exposure, development and transfer. As the charging method, there may be used any conventional method, for example, a corotron- or scorotron-charging method utilizing corona discharge, a contact charging method using a conductive roller or brush, or paper, or the like, in the charging method utilizing corona discharge, the scorotron-charging method has been frequently used in order to keep a dark potential constant. As the developing method, there may be used ordinary developing methods of bringing a magnetic or nonmagnetic one-component developer or two-component developer, etc., into contact or non-contact with the photosensitive member. As the transfer method, there may be used any conventional method using corona discharge, a transfer roller or the like. In addition, the electrophotographic process may usually include a fixing process for affixing the developer onto paper or the like. As the fixing methods, there may be used an ordinary heat- or pressure-fixing method or the like. The electrophotographic process may further include other processes such as cleaning, erasing or the like.

Without being limited to any particular theory, a possible explanation for the reason why the undercoat layer according to the present invention, which comprises at least a binder resin and metal oxide particles treated with the above-described surface-treating agent, can improve properties of the electrophotographic photosensitive member, and is free from coating defects such as crawling even when being formed by coating, is set forth below. However, the effects are not completely understood.

That is, in the metal oxide particles treated with the above-described surface-treating agent, the metal oxide particles as a base material tend to be more strongly bonded to the surface-treating agent as compared to conventional metal oxide particles treated with polysiloxane or the like. Therefore, the surface-treating agent used in the present invention is less liberated in a coating solution as compared to conventional surface-treating agents, so that coating defects such as crawling upon the formation of coating film can be effectively prevented.

Without being limited to any particular theory, a possible explanation for the reason why the strong bond between the metal oxide particles and the above surface-treating agent tends to is set forth below. However, the effects are not completely understood.

That is, it is currently believed that the bond between polysiloxane and metal oxide particles is mainly caused by physical absorption. Therefore, the bonding force therebetween is weak, so that the conventional surface-treating agent tends to be liberated from the metal oxide particles. Even in the case where there is used methyl hydrogen polysiloxane which tends to form a chemical bond with the metal oxide particles as a base material, the ratio of chemically bonded polysiloxane to whole siloxane units is extremely small due to steric hindrance, etc., because polysiloxane is a high-molecular weight compound. As a result, even though polysiloxane is used, the surface-treating agent tends to be liberated from the metal oxide particles as a base material. Whereas, the surface-treating agent used in the present invention comprises a single-molecular compound and has an alkoxy group which is considered to react with the metal oxide particles as a base material. Further, the alkyl group or the alkoxy group bonded to metal is small in steric size and, therefore, causes no steric hindrance upon the reaction with hydroxy groups on the surfaces of the metal oxide particles. As a result, since the surface-treating agent can be readily chemically bonded to the metal oxide particles, it is considered that the bond between the metal oxide particles as a base material and the surface-treating agent is strengthened.

In addition, since the above surface-treating agent used in the present intention has one or more alkyl groups, if reactive groups such as alkoxy groups are sufficiently reacted with the metal oxide particles, there can be obtained metal oxide particles showing a hydrophobic property similar to that obtained by treating with siloxanes such as methyl hydrogen polysiloxane. This is considered to be effective for improving an environmental capability of the undercoat layer.

EXAMPLES

The present invention will now be explained in more detail by examples, but these examples are not intended to limit the scope of the present invention. The "part" used in Examples and Comparative Examples indicates "part by weight" unless otherwise specified.

In the following Examples and Comparative Examples, a copolymerized polyamide A represented by the following general formula was used as the binder resin of the undercoat layer:

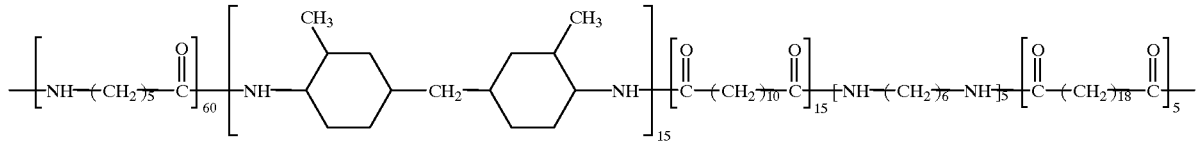

Production of dispersion (P) (present invention)

Titanium oxide (tradename: TTO55N, produced by Ishihara Sangyo Co., Ltd.; average primary particle size: about 40 nm) was previously dispersed together with titania treated with 3% by weight of methyl dimethoxysilane by a ball mill. The obtained titanium oxide slurry was mixed with a solution of the copolymerized polyamide A, and then the mixture was subjected to an ultrasonic dispersion treatment, thereby obtaining a dispersion (P) having a solvent composition ratio of methanol to n-propanol of 7:3, a ratio of titanium oxide to polyamide of 3:1 and a solid content of 16% by weight.

Production of dispersion (Q) (correponding to U.S. Pat. No. 5,6121,158)

Titanium oxide (tradename: TTO-55N, produced by Ishihara Sangyo Co., Ltd.) was previously dispersed together with titania treated with 3% by weight of methyl hydrogen polysiloxane by a ball mill. The obtained titanium oxide slurry was mixed with a solution of the copolymerized polyamide A, and then the mixture was subjected to an ultrasonic dispersion treatment, thereby obtaining a dispersion (Q) having a solvent composition ratio of methanol to n-propanol of 7:3, a ratio of titanium oxide to polyamide of 3:1 and a solid content of 16% by weight.

Example 1

A surface-planished aluminum cylinder having an outer diameter of 60 mm, a length of 350 mm and a thickness of 1.0 mm was immersed in the dispersion (P) and coated therewith, thereby forming an undercoat layer having a dry thickness of 0.75 μm thereon. The procedure was repeated to produce two drums. The number of crawling defects on the drums was counted. As a result, it was confirmed that no crawling was caused on these drums.

Comparative Example 1

A surface-planished aluminum cylinder having an outer diameter of 60 mm, a length of 350 mm and a thickness of 1.0 mm was immersed in the dispersion (Q) and coated therewith, thereby forming an undercoat layer having a dry thickness of 0.75 μm thereon. The procedure was repeated to produce two drums. The number of crawling defects on the drums was counted. As a result, it was confirmed that 664 crawling defects per one drum were caused.

Reference Example 1 (Present Invention)

A surface-planished aluminum cylinder having an outer diameter of 60 nm, a length of 254 mm and a thickness of 1.0 mm was immersed in the dispersion (P) and coated therewith, thereby forming an undercoat layer having a dry thickness of 0.75 μm thereon.

Next, 10 parts of oxytitaniuum phthalocyanine having a specific peak at a Bragg angle of 27.3° (2θ±0.2°) in a powder X-ray diffraction pattern measured using a CuKα ray, 5 parts of polyvinyl butyral (tradename: #6000-C, produced by Denki Kagaku Kogyo Co., Ltd.) were mixed with 500 parts of 1,2-dimethoxy ethane, and then the mixture was pulverized and dispersed by a sand grind mill. The aluminum cylinder on which the undercoat layer was formed, was immersed in the obtained dispersion and coated therewith, thereby forming a charge-generation layer having a dry thickness of 0.3 g/m² (about 0.3 μm) on the undercoat layer.

Next, the thus obtained aluminum cylinder was immersed in and coated with a solution prepared by dissolving in a mixed solvent comprising 1,4-dioxane and tetrahydrofuran, 56 parts by weight of a hydrazone compound represented by the formula:

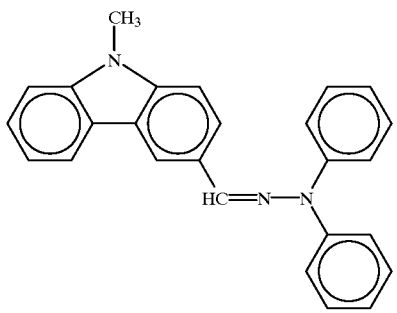

14 parts by weight of a hydrazone compound represented by the formula:

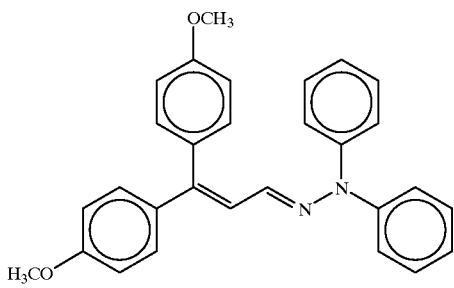

1.5 parts by weight of a cyanogen compound represented by the formula:

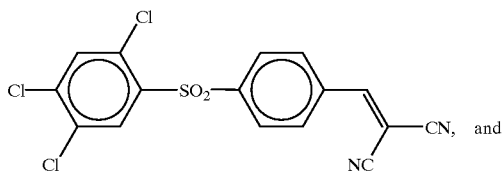

100 parts by weight of a polycarbonate resin produced by a production method described in Examples of Japanese Patent Application Laid-Open (KOKAI) No. 3-221962, incorporated herein by reference, and having two repeating units (molar ratio between monomers: 1:1) represented by the formula:

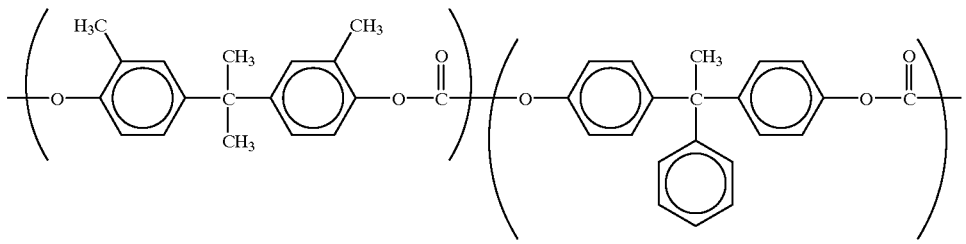

As a result, a charge-transport layer having a dry thickness of 17 μm was formed on the charge-generation layer, thereby obtaining a drum as a photosensitive member A1.

Reference Example 2 (Comparative Example)

The same procedure as defined in Reference Example 1 for production of the photosensitive member A1 was conducted except that the dispersion (P) was changed to the dispersion (Q), thereby producing a drum as a photosensitive member A2.

Reference Example 3 (Comparative Example)

The same procedure as defined in Reference Example 1 for production of the photosensitive member A1 was conducted except that no undercoat layer was formed, thereby producing a as a photosensitive member A3.

Evaluation

Next, these photosensitive members were set on a laser printer (LASER JET 4 Plus manufactured by Hewlett Packard Corp.) and subjected to formation of blank (white) images thereon under various environmental conditions. The obtained images were evaluated. As a result, in the case where the photosensitive members A1 and A2 obtained in Reference Examples 1 and 2, respectively, were used, it was confirmed that blank images having a good quality could be obtained under any of environmental conditions (temperature/humidity) of 5° C./10% (LL), 25° C./50% (NN) and 35° C./85% (HH). However, in the case where the photosensitive member A3 obtained in Reference Example 3 was used, there were observed many fine black spots on blank images under all of the above environmental conditions.

Next, these electrophotographic photosensitive members were set onto a measuring apparatus for measuring properties of photosensitive members, and charged so as to have a surface potential of −700V. Thereafter, the half-decay exposure intensity obtained when 780 nm light was irradiated on the photosensitive members, the potential-retention percentage after the photosensitive member was charged to −700V and allowed to stand for 5 seconds (DDR5), and the residual potential after erase by 660 nm LED light, were measured. The results are shown in Table 1.

TABLE 1

| Photo-sensitive member | Half-decay exposure intensity ($\mu J/cm^2$) | | | Residual Potential (-V) | | | DDR5 (%) | | |
| --- | --- | --- | --- | --- | --- | --- | --- | --- | --- |
| | LL | NN | HH | LL | NN | HH | LL | NN | HH |
| A1 | 0.15 | 0.11 | 0.15 | 34 | 12 | 14 | 96 | 97 | 92 |
| A2 | 0.16 | 0.11 | 0.16 | 44 | 19 | 17 | 97 | 97 | 93 |

TABLE 1-continued

| Photo-sensitive member | Half-decay exposure intensity ($\mu J/cm^2$) | | | Residual Potential (-V) | | | DDR5 (%) | | |
| --- | --- | --- | --- | --- | --- | --- | --- | --- | --- |
| | LL | NN | HH | LL | NN | HH | LL | NN | HH |
| A3 | 0.15 | 0.13 | 0.15 | 29 | 13 | 15 | 93 | 93 | 90 |

In general, when the undercoat layer was provided, the potential-retention percentage could be improved (the value was increased), but the residual potential was deteriorated (the value was increased). In addition, when an inappropriate undercoat layer was formed, the sensitivity was deteriorated (the value of half-decay exposure intensity was increased). As is understood from the above Table 1, the photosensitive member A1 according to the present invention had a sensitivity substantially identical to those of the photosensitive member A2 which is provided with an undercoat layer containing titania treated with methyl hydrogen polysiloxane and the photosensitive member A3 having no under coat layer; a residual potential equal to or higher than that of the photosensitive member A2 having another type undercoat layer; and a potential-retendon percent-age higher than that of the photosensitive member A3 having no undercoat layer. Accordingly, it was confirmed that the photosensitive member according to the present invention as a whole showed enhanced electrophotographic properties as compared to the conventional photosensitive members.

From the above results, the electrophotographic photosensitive member according to the present invention was determined to be a good photosensitive member capable of showing excellent electrophotographic properties and image properties under various environmental conditions. In addition, even though the undercoat layer was formed by coating, the occurrence of defects such as crawling during coating could be remarkably prevented, resulting in increased yield upon the production of electrophotographic photosensitive members and reduction in production costs. Accordingly, the electrophotographic photosensitive member and the process for producing the electrophotographic photosensitive member according to the present invention are outstanding.

As to the titanium oxide according to the present invention, in the above descriptions of the electrophotographic photosensitive member and the process for producing the electrophotographic photosensitive member according to the present invention, it has been suggested that a rigid bond can be established between the surface-treating agent and titanium oxide, so that the obtained undercoat layer tends to show a good hydrophobic property. These facts are explained in more detail by the Examples and Comparative Examples described below.

Example 2

100 parts by weight of titanium oxide (TTO-55N, produced by Ishihara Sangyo Co., Ltd.; rutile type; primary particle size: 0.03 to 0.05 $\mu$m), 3 parts by weight of methyl dimethoxysilane (TSL8117, produced by Toshiba Silicone Co., Ltd.) and 267 parts by weight of methanol were charged into a ball mill, and dispersed together therein. After evaporating methanol, the mixture was baked at 140° C., thereby obtaining titanium oxide surface-treated with methyl dimethoxysilane.

Comparative Example 2

The same procedure as defined in Example 2 was conducted except that diphenyl dimethoxysilane (TSL8172, produced by Toshiba Silicone Co., Ltd.) was used instead of methyl dimethoxysilane, thereby obtaining titanium oxide surface-treated with diphenyl dimethoxysilane.

Comparative Example 3

The same procedure as defined in Example 2 was conducted except that polymethylhydrodiene siloxane (KF-99, produced by Shinetsu Kagaku Co., Ltd.) was used instead of methyl dimethoxysilane, thereby obtaining titanium oxide surface-treated with polymethylhydrodiene siloxane.

Elution Test of Surface-treating Agent

The surface-treated titanium oxide obtained above was placed in a Soxhlet extractor, and 100 g of toluene was added thereto. The mixture was extracted under reflux for 7 hours. The Si concentration of the obtained extract was measured by a fluorescent X-ray analysis. As a reference solution for calculating the concentration, there was used a solution prepared by dissolving polymethylhydrodiene siloxane (KF-99) in toluene. The results are shown in Table 2.

TABLE 2

Si concentration in extract

|  | Si concentration (ppm) |
| --- | --- |
| Example 2 | 2.3 |
| Comparative Example 2 | 183 |
| Comparative Example 3 | 39.5 |

Table 2 showed that the surface-treating agent according to the present invention was liberated to a lesser degree from the surface-treated titanium oxide.

Water-absorption Test

The surface-treated titanium oxide obtained above and untreated titanium oxide (TTO-55N) were allowed to stand in an atmosphere having a temperature of 35° C. and a relative humidity of 85% for 4 hours. The water content was measured by the Karl Fischer's test (coulometric titration method). The results are shown in Table 3.

TABLE 3

Water content of titanium oxide

|  | Water content (%) |
| --- | --- |
| Example 1 | 0.46 |
| Comparative Example 1 | 0.53 |
| Comparative Example 2 | 0.50 |
| TTO-55N | 1.73 |

As seen from Table 3, it was confirmed that the surface-treated titanium oxide according to the present invention showed a sufficient hydrophobic property.

Thus, titanium oxide according to the present invention shows a hydrophobic property and is believed to be strongly bonded to the surface-treating agent. For this reason, the titanium oxide according to the present invention can be readily used in a coating solution or cosmetics.

In accordance with the present invention, there is provided an electrophotographic photosensitive member capable of producing images having a good quality under whole environmental conditions including low-temperature and low-humidity conditions normal-temperature and normal-humidity conditions and high-temperature and high-humidity conditions.

In addition, the present invention also provides titanium oxide having a desirable hydrophobic property and which strongly bonds to the surface-treating agent.

Obviously, numerous modifications and variations of the present invention are possible in light of the above teachings. It is therefore to be understood that within the scope of the appended claims, the invention may be practiced otherwise than as specifically described herein.

This application is based on Japanese Patent Application Serial No. 10-215203 and 11-73292, filed on Jul. 30, 1998 and Mar. 18, 1999, respectively, both of which are incorporated herein by reference in their entirety.

What is claimed is:

1. An electrophotographic photosensitive member, comprising:

a conductive substrate;

an undercoat layer on the conductive substrate, comprising a binder resin and metal oxide particles treated with an organic metal compound represented by formula (2):

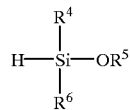

(2)

wherein $R^4$ and $R^5$ are each, independently, methyl or ethyl; and $R^6$ is selected from the group consisting of methyl, ethyl, methoxy and ethoxy; and a photosensitive layer on the undercoat layer.

2. The electrophotographic photosensitive member of claim 1, wherein the metal oxide particles are titanium oxide particles.

3. The electrophotographic photosensitive member of claim 1, wherein the metal oxide particles have an average primary particle size of not more than 100 nm when measured from a TEM micrograph.

4. The electrophotographic photosensitive member of claim 1, wherein the binder resin is an alcohol-soluble resin.

5. The electrophotographic photosensitive member of claim 1, wherein the weight ratio of the metal oxide particles treated with the organic metal compound to the binder resin is 0.5:1 to 10:1.

6. The electrophotographic photosensitive member of claim 1, wherein the binder resin is selected from the group consisting of thermoplastic resins, cellulose-based resins, polyamide resins, epoxy resins, urethane resins, acrylic acid-based resins, methacrylic acid-based resins, thermosetting resins, and photo-curable resins.

7. The electrophotographic photosensitive member of claim 1, wherein the photosensitive layer is a laminate comprising a charge-generating layer on the undercoat layer and a and a charge-transport layer on the charge-generating layer.

8. The electrophotographic photosensitive member of claim 1, wherein the conductive substrate is aluminum, stainless steel, copper, nickel, or is a coated substrate obtained by forming a conductive layer comprising aluminum, copper, palladium, tin oxide, indium oxide on an insulating substrate.

9. The electrophotographic photosensitive member of claim 8, wherein the insulating substrate is a polyester film, paper, or glass.

10. The electrophotographic photosensitive member of claim 1, wherein the binder resin is a polyamide resin.

11. The electrophotographic photosensitive member of claim 1, wherein the binder resin is a polyamide resin containing a diamine component represented by formula (3):

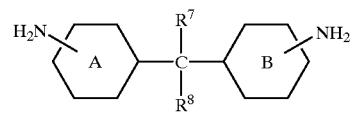

(3)

wherein

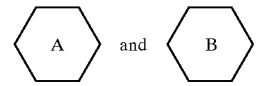

are each, independently, a substituted or unsubstituted cyclohexyl ring; and $R^7$ and $R^8$ are each, independently, a hydrogen atom, an alkyl group, am alkoxy group or in aryl group.

12. A process for producing the electrophotographic photosensitive member of claim 1, comprising forming the undercoat layer on the conductive substrate by coating.

13. The process of claim 12, wherein the binder resin is an alcohol-soluble resin, and a coating solution comprising the binder resin and an alcohol as a main solvent is coated on the conductive substrate.

14. A process for producing the electrophotographic photosensitive member of claim 1, comprising:

applying the undercoat layer on the conductive substrate, and applying the photosensitive layer on the undercoat layer.

* * * * *